US008933985B1

(12) United States Patent
Rapaport et al.

(10) Patent No.: US 8,933,985 B1
(45) Date of Patent: Jan. 13, 2015

(54) METHOD, APPARATUS, AND MANUFACTURE FOR ON-CAMERA HDR PANORAMA

(75) Inventors: Guy Rapaport, Haifa (IL); Ayelet Mashiah, Haifa (IL)

(73) Assignee: Qualcomm Technologies, Inc., San Diego, CA (US)

( * ) Notice: Subject to any disclaimer, the term of this patent is extended or adjusted under 35 U.S.C. 154(b) by 402 days.

(21) Appl. No.: 13/346,551

(22) Filed: Jan. 9, 2012

Related U.S. Application Data

(60) Provisional application No. 61/493,600, filed on Jun. 6, 2011.

(51) Int. Cl.
*H04N 7/00* (2011.01)
*H04N 5/77* (2006.01)

(52) U.S. Cl.
USPC ............................................. 348/36; 386/224

(58) Field of Classification Search
USPC .............. 348/36, 42, 43, 46, 47, 51; 386/224, 386/223, 227, 242
See application file for complete search history.

(56) References Cited

U.S. PATENT DOCUMENTS

| | | | |
|---|---|---|---|
| 6,148,060 A * | 11/2000 | Collins et al. ................... | 378/65 |
| 6,720,993 B1 | 4/2004 | Hwang et al. | |
| 7,110,025 B1 * | 9/2006 | Loui et al. ................ | 348/220.1 |
| 7,197,192 B2 | 3/2007 | Edwards | |
| 7,239,805 B2 | 7/2007 | Uyttendaele et al. | |
| 7,317,844 B1 | 1/2008 | Horne | |
| 7,373,017 B2 | 5/2008 | Edwards et al. | |
| 7,746,375 B2 | 6/2010 | Ketelaars et al. | |
| 8,106,967 B2 | 1/2012 | Tsuchiya | |
| 8,228,392 B2 | 7/2012 | Siddiqui et al. | |
| 2005/0013501 A1 | 1/2005 | Kang et al. | |
| 2005/0030315 A1 | 2/2005 | Cohen et al. | |
| 2007/0242900 A1 | 10/2007 | Chen et al. | |
| 2008/0043114 A1 | 2/2008 | Sung et al. | |
| 2009/0046947 A1 | 2/2009 | Kobayashi | |
| 2009/0060315 A1 | 3/2009 | Harris et al. | |
| 2010/0033553 A1 | 2/2010 | Levy | |
| 2010/0054628 A1 | 3/2010 | Levy et al. | |

(Continued)

FOREIGN PATENT DOCUMENTS

WO    WO 2010/123923 A1    10/2010

OTHER PUBLICATIONS

International Search Report and Written Opinion for International Patent Application No. PCT/US2010/031780 mailed Jun. 11, 2010.

(Continued)

*Primary Examiner* — Robert Chevalier
(74) *Attorney, Agent, or Firm* — Knobbe, Martens, Olson & Bear, LLP (57) ABSTRACT

A digital camera captures a sequence of frames such that captured frames of the sequence alternate between sets of frames, in which each frame in the set has a different exposure setting. Each set of frames includes a nominal exposure frame. For each set of frames of the sequence that is captured after the reference set of frames has been captured, a determination is made as to whether or not the captured set of frames should be saved, based, at least in part, on overlap. For each of the saved sets of frames, the frames in the set are aligned with each other, and then image mixing of the frames in the set of frames is performed to generate a high dynamic range image. A panoramic, high dynamic range image is generated from each of the high dynamic range images.

20 Claims, 3 Drawing Sheets

(56) References Cited

U.S. PATENT DOCUMENTS

| | | |
|---|---|---|
| 2010/0157078 A1 | 6/2010 | Atanassov et al. |
| 2010/0185562 A1 | 7/2010 | Nafeh |
| 2010/0232726 A1 | 9/2010 | Liu |
| 2010/0271512 A1 | 10/2010 | Garten |
| 2011/0211732 A1 | 9/2011 | Rapaport |
| 2011/0254976 A1 | 10/2011 | Garten |
| 2012/0218442 A1 | 8/2012 | Jandhyala et al. |
| 2012/0288217 A1 | 11/2012 | Zhai et al. |
| 2012/0293685 A1 | 11/2012 | Garten |

OTHER PUBLICATIONS

Sunday, D., "Bounding Containers for Polygons, Polyhedra, and Point Sets (2D & 3D)," softsurfer,com, 2001, 12 pages softsurfer.com/Archive/algorithm_0107/algorithm_0107.htm.

Reinhard, E. et al., "High Dynamic Range Imaging Acquisition, Display, and Image-Based Lighting," The Morgan Kaufmann Series in Computer Graphics and Geometric Modeling, 2005, Chapter 4, pp. 115-165.

Kang, S. B. et al., "High Dynamic Range Video," Interactive Visual Media Group, Microsoft Research, Jul. 2003, pp. 1-7.

"Enfuse," last modified Oct. 18, 2010, 8 pages www.wiki-panotools.org/Enfuse.

Gallo et al., "Artifact-free High Dynamic Range Imaging", 2009 IEEE International Conference on Computational Photography (ICCP 2009), US; pp. 1-7, XP002612399; ISBN: 978-1-4244-4534-9.

Grosch et al., "Fast and Robust High Dynamic Range Image Generation with Camera and Object Movement", Proceedings Vision, Modeling, and Visualization 2006; Aachen, Germany; pp. 1-9; XP002612400; ISBN: 978-3-89838-081-2.

Li et al., "Movement Detection for the Synthesis of High Dynamic Range Images", 2010 17$^{th}$ IEEE International Conference on Image Processing (ICIP 2010) Hong Kong; pp. 3133-3136; XP031815216; ISBN: 978-1-4244-7992-4.

Mertens et al., "Exposure Fusion", Computer Graphics and Applications, 2007; 15$^{th}$ Pacific Conference, Oct. 29-Nov. 2, 2007; pp. 382-390; DOI: 10.1109/PG. 2007.17.

Rövid et al., "Gradient Based Synthesized Multiple Exposure Time HDR Image", Proceedings of the Instrumentation and Measurement Technology Conference, 2007 IEEE May 1-3, 2007, Warsaw, Poland; pp. 1-5; DOI: 10.1109/IMTC.2007.379132.

\* cited by examiner

METHOD, APPARATUS, AND MANUFACTURE FOR ON-CAMERA HDR PANORAMA

CROSS-REFERENCE TO RELATED APPLICATIONS

This application is a utility patent application based on a previously filed U.S. Provisional Patent Application Ser. No. 61/493,600 filed on Jun. 6, 2011, the benefit of which is hereby claimed under 35 U.S.C. §119(e) and incorporated herein by reference.

TECHNICAL FIELD

The invention is related to digital cameras, and in particular, but not exclusively, to a method, apparatus, and manufacture for employing a digital camera to generate a high-dynamic range panoramic image in real time.

BACKGROUND

Panoramic photography often employs specialized cameras, equipment and/or software, to capture a sequence of images that are reconstructed into a single image that takes the form of a wide strip with an elongated field of view. Panoramic photography is sometimes known as wide format photography. Typically, a panoramic image shows a field of view that is greater than that of a film camera equipped with a wide angle lens. And a typical film camera equipped with a wide angle lens can generally capture an image with a field of view that covers about 90 degrees across the diagonal of the captured image, e.g., a 35 millimeter film camera with a 22 degree lens can capture such an image. One way to capture a panoramic image is to mount a film camera on a tripod and as the camera is physically rotated about its axis, a succession of images of a scene are taken that are subsequently stitched together by physically cutting and pasting together strips of exposed film where the boundaries between the edges of the film are carefully aligned. In some cases, a wider than usual strip of film can be used with a film camera that employs special movable or stereo optics. In other film cameras, conventional format film, such as 35 millimeter, can be masked during the exposure in the camera to provide a wide aspect or panoramic effect.

Recently, the benefits of electronic photography have led to the general acceptance of digital cameras, which, unlike their film-based counterparts, store captured images in a digital memory such as flash memory. And some digital cameras can also provide a "panorama" feature, which allows a user of the digital camera to capture a sequence of adjacent images that are subsequently "stitched" together into a single image with a wide coverage of field. For example, some digital cameras with a panoramic feature can interface with a personal computer that provides software to externally join together two or more images at their edge boundaries to generate a single image with a wide panoramic format for display on the personal computer.

Generally, when creating panoramic images, the exposure settings are preset according to the first image and kept constant, in order to avoid unpleasant lighting changes in the stitched panorama result.

Images captured by digital cameras are most commonly Low Dynamic Range (LDR) images, in which each image pixel comprises a limited number of digital bits per color. The number of digital bits per pixel is called the digital pixel bit width value. This number is commonly 8 bits. Such 8-bit pixels can be used to form an image with 256 different gray levels for each color at each pixel location. In a LDR image of a scene, shadow areas of the scene are depicted as being completely black (under exposed), bright sunlit areas of the scene are depicted as being completely white (over exposed), and scene areas in between are shown in a range of gray levels. A High Dynamic Range (HDR) image is one that has digital pixel bit width values of greater than 8 bits; 16 bits per pixel is a possible value. In such an image the full range of gray levels that appear in a physical scene can be displayed. These gray levels provide image details that are present in the scene's shadow regions, highlight regions and mid tone regions that are missing from the LDR image. Thus, in an HDR image, aside from the mid-illuminated areas of the scene, even scene details in dark areas (e.g., shadows) or well-lighted areas (sunlight) can be accurately represented.

An HDR image can be captured by acquiring multiple LDR images of a scene that are captured at different exposure levels. These multiple LDR images are called a bracketed exposed image series. A low exposure level will properly capture the gray levels in scene areas fully illuminated by bright sunlight and a high exposure level will properly capture the gray levels in scene areas that are dimly lighted (e.g., areas that are shadowed by other objects like buildings). However, at the low exposure level the areas of the scene in shadow will be completely dark and will show no detail, and the midtone areas will lose detail. Further, at the high exposure level, the highlights of the scene will be completely saturated, and will show no detail, and the mid-tone areas will again lose detail. Thus, a third, mid exposure level image, which properly captures mid level gray shades, may be used as well. By mixing these three LDR images, an HDR image can be generated that depicts the full gray scale range of the scene.

BRIEF DESCRIPTION OF THE DRAWINGS

Non-limiting and non-exhaustive embodiments of the present invention are described with reference to the following drawings, in which.

DETAILED DESCRIPTION

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" includes plural reference, and the meaning of "in" includes "in" and "on." The phrase "in one embodiment," as used herein does not necessarily refer to the same embodiment, although it may. Similarly, the phrase "in some embodiments," as used herein, when used multiple times, does not necessarily refer to the same embodiments, although it may. As used herein, the term "or" is an inclusive "or" operator, and is equivalent to the term "and/or," unless the context clearly dictates otherwise. The term "based, in part, on", "based, at least in part, on", or "based on" is not exclusive and allows for being based on additional factors not described, unless the context clearly dictates otherwise. The term "coupled" means at least either a direct electrical connection between the items connected, or an indirect connection through one or more passive or active intermediary devices. The term "signal" means at least one current, voltage, charge, temperature, data, or other signal.

Briefly stated, the invention is related to employing a digital camera to capture a video stream such that captured frames of the video stream cyclically alternate between different exposure settings. Each set of frames with varying exposure settings includes a nominal exposure frame. For each set of frames of the video stream that is captured, a determination is made using the nominal exposure frames as to whether or not the captured set of frames should be saved, based, at least in part, on overlap. For each of the saved sets of frames, the frames in the set are aligned with each other, and then image mixing of the frames in the set of frames is performed to generate a high dynamic range image. A panoramic, high dynamic range image is generated from each of the high dynamic range images.

Figure 1:
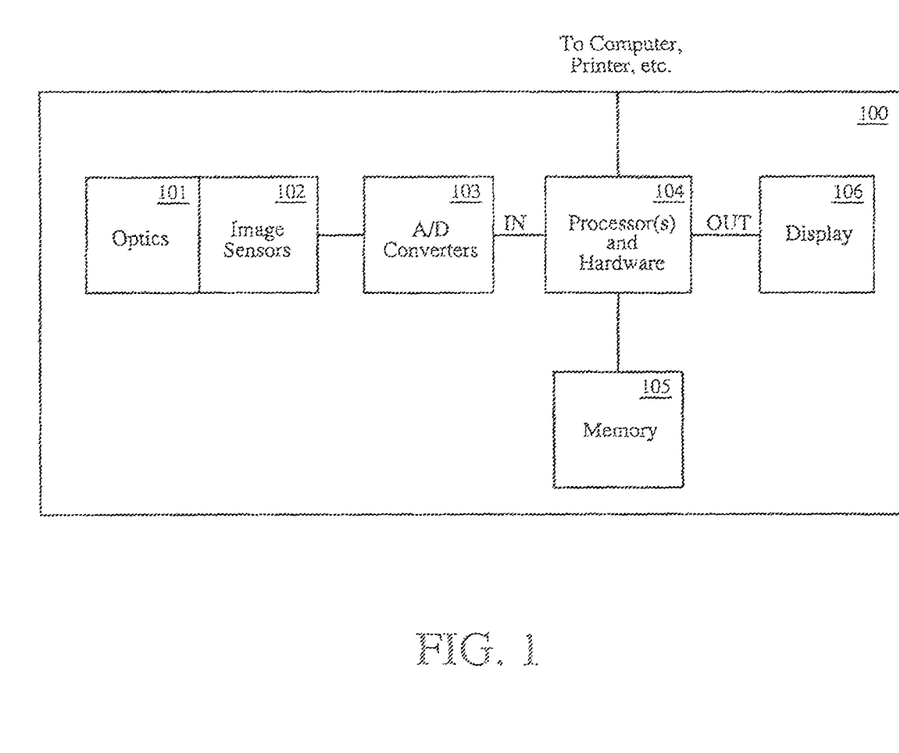
FIG. 1 illustrates a block diagram of an embodiment of a device.

FIG. 1 shows a block diagram of an embodiment of device 100, which may be a digital camera or the like. Digital camera 100 includes a set of optics (e.g., one or more lenses and/or light guides) 101, a set of image sensors 102 optically coupled to the optics 101, a set of analog-to-digital (A/D) converters 103 having inputs electrically coupled to outputs of the image sensors 102, and one or more processors and hardware 104 coupled to receive the outputs of the A/D converters 103. The image sensors 102 may produce separate R, G and B color signals. Camera 100 further includes a display device 106 coupled to outputs of the processor(s) and hardware 104, and a memory 105 having bi-directional communication with the processor(s) 104. Display device 106 is optional, and is not included in all embodiments of digital camera 100.

In operation, the image sensors 102 receive input light through the optics 101 and, in response, produce analog output color signals R, G and B to the A/D converters. The A/D converters convert those input color signals to digital form, which are provided to the processor(s) 104.

The processor(s) and hardware 104 may include a CPU as well as specialized hardware, as discussed in greater detail below. Processor(s) 104 may perform any of various well-known types of processing on those input color signals. The processor(s) 104 may be or include, for example, any one or more of: a programmed microprocessor or digital signal processor (DSP), a microcontroller, an application specific integrated circuit (ASIC), a programmable logic device (PLD), etc. Processor(s) and hardware 104 may perform various processes, such as the process illustrated in FIG. 2.

The memory 105 may be or include, for example, anyone or more of: flash memory, read-only memory, random access memory (RAM), etc. Memory 105 may include a tangible, processor-readable storage medium that arranged to encode processor-readable code, which, when executed processor(s) 104, enables actions. Actions enabled by processor(s) 104, which may include action(s) controlled by processor(s) 104 but actually performed by other parts of digital camera 100, may perform various processes such as the process illustrated in FIG. 2.

Digital camera 100 is not limited to consumer digital cameras, but may include other types of imaging devices that capture images in a variety of different manners.

Processed or raw color data can be output to the display device 106 for display and/or to one or more external devices, such as a computer or printer. Digital camera 106 is typically not connected to external devices when performing the process illustrated in FIG. 2.

Figure 2:
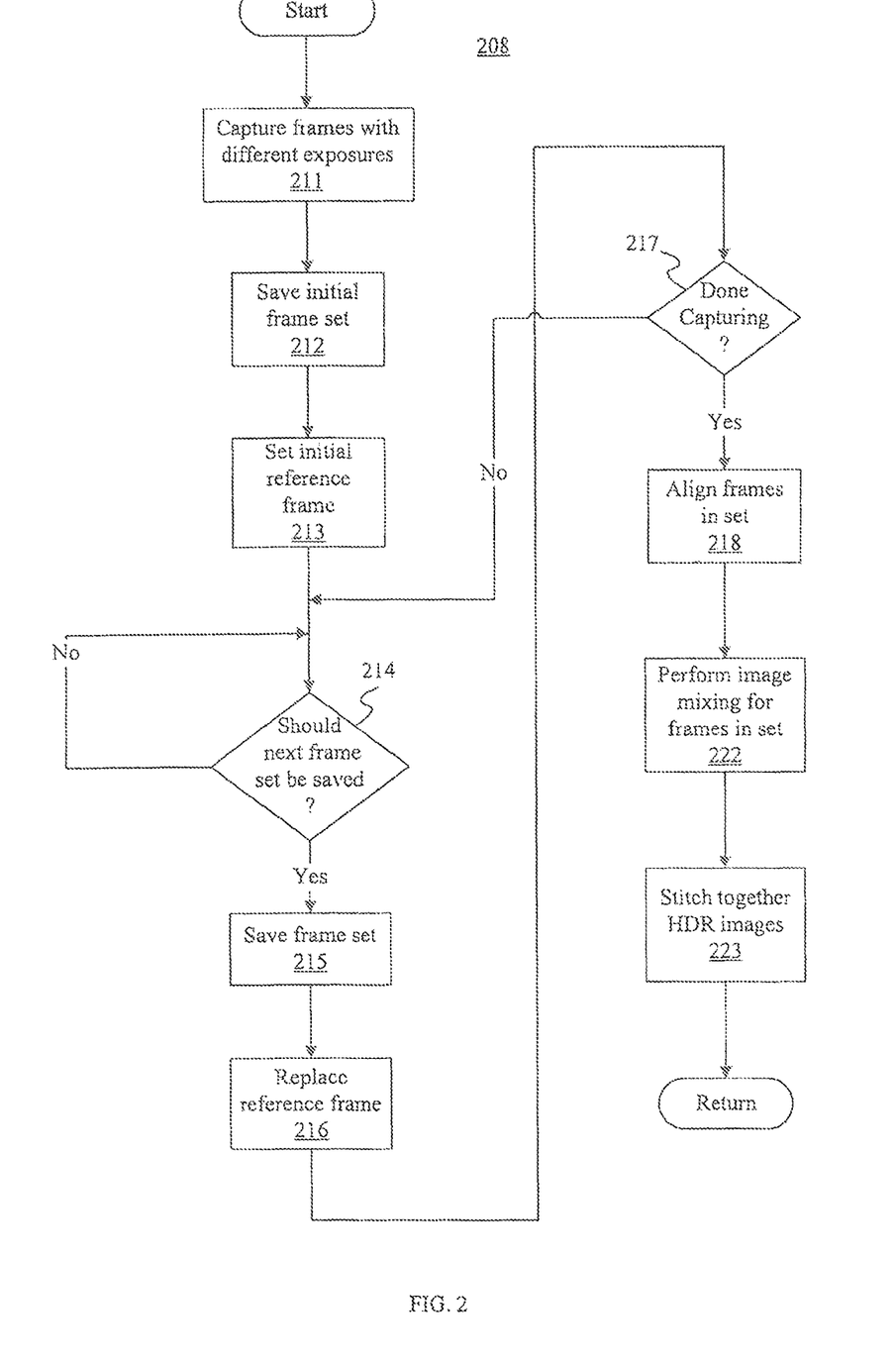
FIG. 2 shows a flowchart of an embodiment of a process that may be employed by an embodiment of the device of FIG. 1.

FIG. 2 shows a flowchart of an embodiment of process 208. Various embodiment of process 208 may include more or less steps than illustrated in FIG. 2. After a start block, the process proceeds to block 211, where a digital camera captures frames such that the captured frames cyclically alternate between different exposure settings. Because the frames cyclically alternate between different exposures setting, the frames may be thought of as sets of frames, where each set of frames includes N frames (N>=2), each with a different exposure setting. Specifically, in each set, one of these frames is a nominal exposure frame. In some embodiments, the captured frames are captured frames of a live video stream such that captured frames of the video stream cyclically alternate between different exposure settings, where the captured video is at least 10 frames per second.

The process then proceeds to block 212, where an initial set of frames is saved. The initial set simply refers to the initial set of frames that are saved. In some embodiments, the initial set of frames is the first set of frames capturing in the HDR panorama mode. In other embodiments, a later set of frames may be employed as the initial frame set.

The process then advances to block 213, where the initial reference frame is set as the nominal exposure frame in the initial set of frames. The process then proceeds to decision block 214, where a determination is made as to whether or not the next frame set should be saved. The determination at decision block 214 is made based, at least in part, on whether the overlap between the nominal exposure frame of the captured set of frames and reference frame is suitable for generating a panoramic image. In some embodiments, additional factors may also be employed in the determination.

If the determination at decision block 214 is negative, the process returns to decision block 214, another set of frames is captured, and a determination is made as to whether or not to save this next frame set. However, if it is determined at decision block 214 that the set of frames should be saved, the process advances to block 215, where the frame set is saved. The process then proceeds to block 216, where the reference frame is replaced with the nominal frame of the set of frames that was just saved at block 215.

The process then advances to decision block 217, where a determination is made as to whether or not the digital camera is done capturing frames (where, in some embodiments, the capturing is done after a predetermined number of sets of frames are saved, including the reference set of frames and at least one additional set of frames). If not, the process moves to decision block 214.

However, if the determination at decision block 217 is positive, the process then advances to block 218, where the frames in each saved set are aligned with each other frame in the set. The process then proceeds to block 222, where, in each of the saved sets of frames, image mixing of the frames in the set of frames is performed to generate a high dynamic range image, so that one high dynamic range image is generated for each saved set of images. Although not shown in FIG.

2, in certain embodiments, optional ghost removal and optional tone mapping may also be performed in some embodiments.

The process then moves to block 223, where the digital camera is employed to generate a panoramic, high dynamic range image from each of the high dynamic range images. The processing then advances to a return block, where other processing is resumed.

The steps performed at block 218 and 222 may be performed in a different part of the process in various embodiments. For example, in some embodiments, instead of beginning the steps of block 218 and 222 after capturing is completed, in other embodiments, the steps of block 218 and 222 are performed for each set after that set is saved. This may happen before the next steps in the process, or concurrently with other actions in the process.

Figure 3:
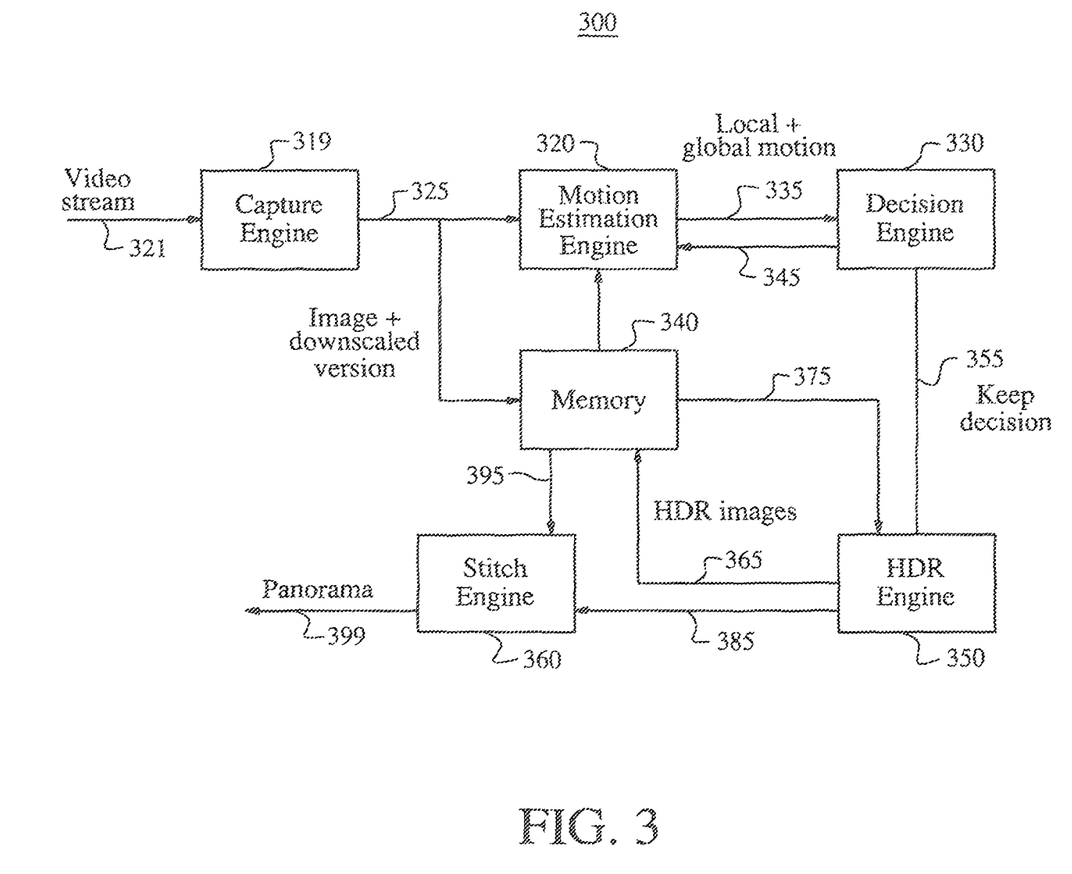
FIG. 3 illustrates a functional block diagram of an embodiment of the device of FIG. 1, in accordance with aspects of the invention.

FIG. 3 illustrates a functional block diagram of an embodiment of digital camera 300, which may be employed as an embodiment of device 100 of FIG. 1. Digital camera 300 includes capture engine 319, motion estimation engine 320, decision engine 330, memory 340, HDR engine 350, and stitch engine 360.

In one embodiment, digital camera 300 operates as follows. Capture engine 319 receives a sensor raw (e.g., Bayer) video sequence (321) with exposure settings that change in a cyclic manner between N different exposure values, where N is at least two. In some embodiments, the video capture for generating the HDR panoramic image is initiated by the user pressing and holding down a shutter button on the digital camera, where the user sweeps the camera across the scene while holding down the shutter button. Raw video 321 is captured while this occurs.

Capture engine 319 converts each sensor raw image 321 to a YUV or RGB image (or other color space) and saves it 325 to memory 340. In various embodiments, the number of images with different exposures may vary according to the desired application. The number of images may affect the processing time, memory requirements, and the quality of the resulting HDR panorama. For example, an embodiment with two images (N=2) may allow for a minimal running time at the cost of HDR quality, while more images may obtain more high dynamic content from the scene with slower running time. In another embodiment, N is three, and the three exposure settings may be one image with typical exposure (where the typical exposure may be calculated using auto-exposure mechanism which are popular in cameras), one over-exposed image having a higher exposure value, and one under-exposed image having a smaller exposure value.

One of the exposure values in each cycle is regarded as the "nominal exposure". As explained in greater detail below for one embodiment, an automatic real-time decision process chooses from the captured video stream the suitable frames (with proper overlap and quality) for a panorama image. During this process, the "nominal exposure" frames will be used to determine the representative frame for the panorama, and once a "nominal exposure" frame has been chosen as representative frame, its adjacent captures (with different exposures) will be saved as well. For example, if the exposure period consists of three different exposures (N=3), for every chosen representative, three images with different exposures are saved. The representative frames for the panorama are chosen as those with proper overlap and quality (determined, for example, in some embodiments, by low local motion in the frame).

For the "nominal exposure" frames, Capture engine 319 also produces a motion estimation image 325 which is saved to memory. In some embodiments, the motion estimation image may be done on a downscaled version of the "nominal exposure" frame in order to improve running time and memory requirements. Further, rather than using the entire frame, a portion of the frame may be used, or the frames may be used as a whole and cropped down to a smaller size.

The motion estimation image 325 is fed into a motion estimation engine 320 (once every N frames), which evaluates the global and local motion between the current and a reference motion estimation image from memory 340.

In some embodiments, the motion estimation is performed as follows. The output of the motion estimation (ME) is a few hundreds of motion vectors. ME engine 320 chooses from this pool the robust MV and then creates a 2D histogram of these MV. ME engine 320 chooses the single MV for each frame as the one that corresponds to the largest bin in the histogram. In some embodiments, ME engine 320 applies some additional rules on this MV, such as if a few MV with similar directions have very high histogram values we will calculate our single MV as a weighted sum of these. Other rules are also applied in some embodiments.

In the case of horizontal motion, only the X component of the MV is relevant for overlap purposes (the Y component is used as an indicator of an unwanted drift). The X motion is indicative of when a frame that has the target overlap with a previously chosen frame has been reached. The global motion detection may be used to determine the sweep direction, so that if the global motion is primarily horizontal, the overlap margin is horizontal and the eventual panoramic image generation will be horizontal.

Once the required overlap margins have been reached, the frame is tested for local motion. By using the difference between the calculated motion vectors of the current and the previous frames overlapping regions may be found and registered. The frame is divided into corresponding blocks, and in each block the illumination values of the two images is subtracted, and summed over the differences. If a large percentage of the blocks have high value for the sum of differences, the frame is deemed to contain large local motion, and will subsequently be discarded by decision engine 330.

Decision engine 330 estimates whether the global motion 335 is within the required overlap margins and whether the local motion 335 is small enough and makes a choice 345 as to whether the current "nominal exposure" image and its N-1 corresponding exposure images should be saved for the panorama or discarded. Decision engine 330 decides whether to keep each N images in real time so that no more than N frames of the captured video need to be retained at a time in the memory buffer. The frames that are chosen to be saved by decision engine 330 are saved in memory 340 so that the memory buffer is free for the next frames to be captured, and the frames which are not chosen to be saved by decision engine 330 are simply discarded. In some embodiments, a log is maintained of the overlap of each of chosen nominal exposure image, where this log may assist in the subsequent image stitching. In case these images are kept, the motion estimation image will be used as the new reference frame for the consecutive frames.

In some embodiments, the middle half of each frame is used with an overlap of 50% between the chosen half-frames, so that the required overlap of a frame with a previously chosen frame is 75%. For one embodiment, a 1280×720 video stream is used, and once the current frame is shifted 1280× 0.25=320 pixels horizontally with respect to a previously chosen frame, the current frame is saved. In another embodiment, a 25% overlap is required between the half-frames, and then the required overlap between chosen frames is 37.5%. Shorter overlaps lessen the ability to cope with scene motion between frames.

In some embodiments, the actions performed by HDR engine 350 take place after frame sets are selected. In HDR engine 350, each chosen set of N images are merged to create one high dynamic range image 365, which is saved to memory 340. That is, the N images with the various exposures that were captured near the chosen representative are used as an input to an HDR algorithm, which contains the following stages. The first stage is image registration (i.e., alignment) of N−1 images to the corresponding representative (with nominal exposure) coordinates. The next stage is image mixing of the N aligned images in order to create a high dynamic range image. In some embodiments, the image mixing stage may be performed with optional ghost removal functionality. In other embodiments, ghost removal is not performed. In some embodiments, the HDR algorithm is complete after the image mixing stage. In other embodiments, there is another stage after the image mixing, the tone mapping stage, in which the tones of the high dynamic range image are mapped into the display device's dynamic range (e.g., 8-bit representation). The output at the completion of all of the HDR algorithm stages is the HDR image 365.

In some embodiments, the HDR algorithm performed by HDR engine 350 may be performed as follows.

As previously discussed, the first step of the HDR algorithm is image registration. The goal of image registration is to align all of the images to the same set of coordinates. In some embodiments, there are three images, one nominal image (denoted as Medium), one over-exposed image (denoted as Bright), and one under-exposed image (denoted as Dark). Further discussion of one embodiment of the HDR algorithm will discuss an embodiment with three such images, but the invention is not so limited, and other numbers and types of images may be employed in other embodiments. In order to align the three images, two registration procedures are incorporated: the first aligns the dark image with the medium image, and the second aligns the bright image with the medium image.

The image registration process identifies and compensates for the global motion of the scene between two different captured frames. This stage is employed for the HDR algorithm because some embodiments of digital camera 300 are handheld, and thus may suffer from the effects of shaky holding. In some embodiments, the alignment scheme consists of four stages:

Motion vector extraction—a set of motion vectors are extracted between the two images;

Global motion estimation—a global transformation model, usually, but without limitation, affine, is assumed between the images. A random sample consensus (RANSAC) algorithm is applied on the motion vectors in order to estimate the most probable transformation parameters;

Image warping—according to the estimated global transformation, typically a hardware based warping mechanism transforms the dark or bright image onto the medium image coordinates; and, Unified Field of View—due to the camera motion, there may be some differences between the images' fields of view. At this stage, the maximal field of view that exists in all three images is computed. Later, after the stitching mechanism, a cropping operation is applied on the stitched HDR images in order to create a rectangular panoramic image.

As discussed above, after the image registration is performed, image mixing is performed, which blends the three images together. The image mixing stage of the HDR algorithm may also be referred to as the image fusion stage. The mixing is performed as follows: using the medium image as reference for example, the dark image contributes information in overexposed areas and the bright image contributes information in under-exposed areas. This mixing rule is used when the scene is static as noted before. However, when local motion exists in the scene, as shown in certain examples above, the mixing may lead to visible artifacts in the HDR result, known as ghost artifacts. Accordingly, in some embodiments, in order to overcome these motion-related artifacts, a ghost treatment mechanism is applied as part of the image fusion stage.

The image mixing basic operation employs two images with different exposures and blends them together according to a pixel-wise blend factor. In order to describe the steps of the image mixing procedure, denote the image which is less exposed as $I_1$ and the image with greater exposure as $I_2$. The exposure value of each image will be denoted as ExpVal1 and ExpVal2 respectively. The exposure value in computational photography is calculated according to the following formulation:

$$\text{ExpVal} = \frac{ISO \cdot \text{ExpTime}}{F_\#^2}$$

Where ISO represents the ISO level, ExpTime represents the exposure time and $F_\#$ represents the F-number of the optical system.

The following stages are applied within the image mixing scheme. Firstly a preprocessing stage comprising of:

If $I_1$ or $I_2$ are given in the gamma domain (not in the linear domain), then a degamma operation is applied in order to represent the input images in the linear domain; and, The brighter image, $I_2$, is normalized to the exposure value of the darker image, $I_1$. The manipulations on the input image can be summarized as:

$$\begin{cases} I_1^{upd} = DeGamma(I_1) \\ I_2^{upd} = DeGamma(I_2) \cdot \frac{\text{ExpVal}_1}{\text{ExpVal}_2} \end{cases}$$

Secondly the calculation of blending weights takes place. In order to determine the weights, the luminosity values (luma, which will be denoted as Y) of the brighter image, $I_2$, are used as an input to a weighting look-up table (LUT). This can be formulated as $w=LUT(Y_2)$. The Weighting LUT can be described as a general mapping, but may be implemented as piecewise linear function.

Lastly, the mixing is performed, where the actual mixing operation is performed according to the following formulation:

$$I_{out} = (1-W) \cdot I_1^{upd} + W \cdot I_2^{upd}$$

In some embodiments, the mixing operation takes dark pixels from $I_2^{upd}$, bright pixels from $I_1^{upd}$ and performs pixel-wise blending between the two images for medium luma values. In various embodiments, any images from the series may be processed in any order.

In some embodiments, a ghost removal process may be performed as follows. The ghost treatment mechanism aims to identify areas with local motion between the three HDR inputs. In these areas, the ghost removal process is employed to ensure that the HDR fusion results do not contain a blend of the images, since this may lead to a ghost artifact, e.g., a walking person may be seen twice or more. Instead, only a single image is chosen to represent the HDR fusion result in the specified area (i.e. a patch). Accordingly, some embodiments of the ghost treatment mechanism have the following stages:

Motion detection—identifying if local motion exists between the HDR input images. This stage is performed per pixel;

Defining ghost patches—in this stage, the pixels that suffer from motion are clustered into patches (image blobs) using morphological operations;

Patch selection—each of the identified patches is represented by a single input image. In this stage, a score function is used in order to decide if the information will evolve from the exemplary bright, medium or the dark image; and Patch correction—in this stage, typically a hardware based patch correction is used in order to replace the ghost patch with the selected input image.

As previously discussed, after the image mixing stage (which includes ghost removal in some embodiments), a tone mapping stage is performed in some embodiments. In some embodiments, at the end of the image fusion stage, the resulting High Dynamic Range image is represented as a linear RGB image with 12 bits per color component. The tone mapping task is to transform the 12-bit representation into an 8-bit representation. This stage is employed to allow the image to be presented on common display devices. The main challenge at this stage is to perform intelligent tone mapping that will preserve the perceptual added-value of the image fusion process even in the 8-bit representation.

In PC-based HDR algorithms, the tone mapping stage is usually tailored and optimized per HDR scene and regularly requires human assistance. The described method provides an on-camera, real-time, hardware-based tone mapping solution, which can adaptively change its behavior according to the captured scene characteristics.

While there are many possible techniques for performing tone mapping, the disclosed tone mapping algorithm is based on two distinct transformations which are controlled by pre-defined LUTs:

(a) Global mapping—Performing a gamma-like mapping on the HDR fusion result (still maintaining 12 bits per color component). The mapping is usually the inverse of the degamma operation used at the beginning of the fusion stage of the HDR algorithm. This selection is made since it is preferable to maintain similarity to the colors and atmosphere of the input images.

(b) Local mapping—Performing a non-linear, local mapping that maps a pixel according to its neighbors' average luminosity values into an 8-bit representation per color component. Such a tone mapping operator excels in dynamic range compression while preserving local contrast, while tone mapping operations that use only the pixel information tend to damage the local contrast.

Since the LUTs of these mappings are predefined, a simple way to adaptively change the behavior of the tone mapping stage is to define a family of local mapping LUTs (with a single global mapping LUT) and use a chosen LUT representative for every HDR operation. This however requires some additional heuristics and preprocessing investigation in order to detect in which scenario to use a specific LUT. For example, one may use the luminosity values of the input images in order to identify in which LUT to use.

A more sophisticated solution for the adaptive tone mapping challenge, as performed in some embodiments of the invention, is to perform an on-line alteration of the mappings in order to grasp the entire dynamic range of the scene. Thus, in accordance with these embodiments, an additional global mapping on the luminosity component of the HDR fusion result, right after the gamma transform, is introduced. The additional global transform deviates from the unitary transform (Y=X) in order to allocate additional gray scale levels for more frequent luminosity values. For example, if a dominant portion of the image is bright, more gray scale levels are allocated for bright luminosity levels at the expense of darker luminosity levels. By using this adaptive mapping with a pre-defined gamma LUT and local mapping LUT, the image may include similar colors as the original image, adapt the luminosity levels (without affecting the scene colors) with the adaptive mapping, and add flavors to the HDR tone mapping result by defining the local-mapping LUT.

The aforementioned adaptive tone mapping algorithm contains the following stages in some embodiments:

(a) Constructing a luminosity histogram of HDR image after the gamma LUT transformation. Since this may prove to be computationally expensive, an estimated histogram can be produced by using a combination of histograms of the down-scaled input images. The estimated histogram is obtained using the following steps:

(a1) Transforming the three images to the gamma domain, with exposure compensation, where the exposure compensation ensures that the luminosity levels in all the images are aligned:

$$\begin{cases} \tilde{I}_{dark} = I_{dark} \\ \tilde{I}_{medium} = \text{Gamma}\left(DeGamma(I_{medium}) \cdot \frac{ExpVal_{dark}}{ExpVal_{medium}}\right) \\ \tilde{I}_{bright} = \text{Gamma}\left(DeGamma(I_{bright}) \cdot \frac{ExpVal_{dark}}{ExpVal_{bright}}\right) \end{cases}$$

(a3) Merging the three histograms into a single HDR histogram by using two predefined thresholds: BrightTH and DarkTH—

$$Hist_{HDR}(i) = \begin{cases} Hist_{bright}(i) & i \in [0, BrightTh] \\ Hist_{medium}(i) & i \in [BrightTH+1, DarkTH-1] \\ Hist_{dark}(i) & i \in [DarkTH, 255] \end{cases}$$

Where $Hist_{HDR}$ represents the combined histogram and $Hist_{bright}$, $Hist_{medium}$, $Hist_{dark}$ represent the histogram of the input images after exposure compensation and gamma-LUT.

(b) Defining a mapping according to the distribution of luminosity values. A wider range of output levels should be given to the most populated regions of the luminosity histogram. One technique for defining such a mapping is histogram equalization. Here a similar concept is used:

(b1) Normalizing the histogram, $$p(i) = \frac{Hist_{HDR}(i)}{\sum_j Hist_{HDR}(j)}$$

(b2) Calculating the cumulative distribution function, $$Pr(i) = \sum_{j \leq i} p(i)$$

(b3) Defining the mapping as $T(i) = \alpha \cdot Pr(i) + (1-\alpha) \cdot i$

Where $\alpha \in [0,1]$ is a strength factor, which blends between the histogram equalization transform and the unitary transform. The strength factor is useful in cases where the histogram equalization is too aggressive and may result in deterioration of the image quality.

After the tone mapping is performed, the resulting image is the HDR image 365, which is saved to memory 340. An HDR image 365 is generated by HDR engine 350 for each set of frames chosen to be saved to memory 350 by decision engine 330, and each of the resulting HDR images 365 is saved to memory 350.

Consecutively, Stitching engine 360 begins to merge the high dynamic range images from memory 340 into a panoramic image 399. In some embodiments, the stitching may be performed as follows.

First, each HDR image is initially projected/converted from rectilinear coordinates into cylindrical coordinates. This cylindrical projection employs look up tables (LUT), sparse sampling, and interpolation acceleration hardware to quickly generate the cylindrical coordinates from the rectilinear coordinates.

In some embodiments, look up tables (LUTs) are employed to calculate trigonometric functions required for the projection, and the cylindrical coordinate values are subsequently interpolated out of these LUTs. Also, an image can be warped quickly into a cylindrical projection by the use of dedicated acceleration. The acceleration hardware accepts a sparse grid of transformation coordinates. Additionally, for each pixel, the transformation is evaluated by interpolating the transformation coordinates between these sparse grid points. By implementing the sparse grid transformation with hardware, the image can be transformed into cylindrical coordinates at a relatively fast rate.

Next, to compensate for the alignment inaccuracy, automatic detection of the precise image alignment is performed. The alignment is achieved by estimating the parameters of an image transformation that minimizes some error metric between the images. An example of such a parametric transformation is the affine transformation:

$$x'=a_{11}x+a_{12}y+a_{13}\ y'=a_{21}x+a_{22}y+a_{23}$$

The transformation is estimated and applied on the images after they have been warped to a cylindrical surface.

Correspondences are found between two (projected) images, which are locations in one image which match locations in another image. This is done by selecting the overlap region of one of the images as a 'target', and the corresponding overlap region of the other image as 'reference', and performing block based motion search from target to reference.

For motion search, many techniques can be employed. However, in at least one embodiment, the motion search is a mean-normalized SAD (sum of absolute differences) based: i.e., the motion of a block of pixels in the target frame is determined by the location of the block in the reference frame for which the MNSAD is minimal.

In some embodiments, the motion search is performed quickly by a specific hardware accelerator, which accepts the reference and target images and returns a list of 'motion vectors', for each block in these images.

The motion search can be performed on a low resolution copy of the images, and then refined by performing an additional search in higher resolution. The motion search can be further improved by applying corner detection on the image, since corners are more likely to return reliable motion vectors. Also, robustness measure can be extracted by observing the MNSAD map as a function of the (u,v) motion vector and determining whether the minima that produced MV(x,y) is unique.

After motion search there is a set of correspondences in each image pair:

$$(x_i,y_i) \Leftrightarrow (x_i',y_i')=(x_i+MV_x(x_i,y_i),y_i+MV_y(x_i,y_i))$$

An assumption is made that there is a set of K correspondences between the two images:

$$(x_i,y_i) \Leftrightarrow (x_i',y_i')$$

And the algorithm estimates an affine function that links the images:

$$\hat{x}'=h_1 x+h_2 y+h_3\ \hat{y}'=h_4 x+h_5 y+h_6$$

By minimizing an SSE (sum of squared error) energy function:

$$\text{minimize} \sum_{i=1}^{K} \|(x_i', y_i')^T - (\hat{x}_i', \hat{y}_i')^T\|^2$$

This is a linear regression problem with a closed solution.

The correspondences reported by motion estimation do not, in general, contain only 'true' correspondences. There can be many factors which contribute to 'false' correspondences:

Local Motion—if an object moved within the scene, than its motion is not related to the global displacement caused by the camera rotation. The motion vectors related to it should be discarded.

Disappearance/Occlusion—a target block could, in some cases, not exist in the reference image; this can be because it has moved out of the image area or been occluded due to local motion/motion parallax. In this case false motion vectors are usually introduced.

False Motion—though the motion estimation flow is robust, it is not perfect. Sometimes the search yields erroneous motion vectors; these should be discarded.

A RANSAC (random sample consensus) algorithm is employed for the estimation of the transformation from these correspondences. In the process, transformation estimates and reject outliers are iteratively built. The final transformation is calculated by taking the group of all inliers (which are labeled I), and estimating a transformation by the least squares (linear regression) equations which solves the minimization problem presented above.

$$\begin{pmatrix} a_{11} \\ a_{12} \\ a_{13} \end{pmatrix} = \begin{pmatrix} \Sigma x_i^2 & \Sigma y_i x_i & \Sigma x_i \\ \Sigma y_i x_i & \Sigma y_i^2 & \Sigma y_i \\ \Sigma x_i & \Sigma y_i & N \end{pmatrix}^{-1} \begin{pmatrix} \Sigma x_i x_i' \\ \Sigma y_i x_i' \\ \Sigma x_i' \end{pmatrix}$$

$$\begin{pmatrix} a_{21} \\ a_{22} \\ a_{23} \end{pmatrix} = \begin{pmatrix} \Sigma x_i^2 & \Sigma y_i x_i & \Sigma x_i \\ \Sigma y_i x_i & \Sigma y_i^2 & \Sigma y_i \\ \Sigma x_i & \Sigma y_i & N \end{pmatrix}^{-1} \begin{pmatrix} \Sigma x_i y_i' \\ \Sigma y_i y_i' \\ \Sigma y_i' \end{pmatrix}$$

Where the summation is over $i \in I$, and $N=|I|$.

Once an affine transformation has been estimated linking each pair of images, each image is rendered on the panorama canvas by applying the appropriate affine transformation. In some embodiments, this is done very quickly using the Image Interpolation Accelerator hardware.

In some embodiments, the Image Interpolation Acceleration hardware is employed to quickly perform any kind of transformation to an image.

In a transformation in which the image coordinates (x',y')=T(x,y). (x',y') are coordinates in the output image (for example, for a cylindrical transformation (x',y') is actually (φ,h)). In some embodiments, the hardware can evaluate the inverse transformation (x,y)=T$^{-1}$(x',y').

Warping an image means, for each output pixel at (x',y'):

$(x,y)=T^{-1}(x',y')$

If (x,y) is inside the input image

OutputPixel(x',y')=Interpolate from the input pixels around (x,y)

Otherwise

OutputPixel(x',y')=0

Each output pixel at coordinates (x',y') may be transferred to the input image coordinates (x,y) via the inverse transform T$^{-1}$; such that the output pixel is generated by interpolating values from the nearby input pixels.

The actual pixel value may be calculated by the bi-linear interpolation algorithm:

$m$=floor($x$)

$fm=x-m$ $n$=floor($y$)

$fn=y-n$

OutputPixel(x',y')=(1−fm)*(1−fn)*InputPixel(m,n)+ fm*(1−fn)*InputPixel(m+1,n)+ (1−fm)*fn*InputPixel(m,n+1)+fm*fn*InputPixel(m+1,n+1)

Assuming that there is prepared sparse samples of the inverse transformation. i.e., there is stored in memory a set of numbers TX$_{ij}$ and TY$_{ij}$ so that:

$(TX_{i,j},TY_{i,j})=T_{-1}(x'=B_x \cdot i, y'=B_y \cdot j)$

Where B$_x$ and B$_y$ are the width and height of the sparse grid blocks. In this case, there can be given an approximation of the inverse transformation for any output pixel (x',y') by interpolating between the values, in a very similar manner to which the pixel values are interpolated.

T(x',y') is calculated by $i$=floor($x'/Bx$)

$fi=x'/Bx-i$ $j$=floor($y'/By$)

$fj=y'/By-y$

T(x',y')≈(1−fi)*(1−fj)*(TX$_{ij}$,TY$_{ij}$)+fi*(1−fj)*(TX$_{i+1,j}$, TY$_{i+1,j}$)+(1−fi)*fj*(TX$_{ij+1}$,TY$_{ij+1}$)+fi*fj*(TX$_{i+1,j+1}$, TY$_{i+1,j+1}$)

In this way the hardware can very quickly evaluate any transformation, even the cylindrical transformation which involves evaluation of trigonometric functions.

The sparse grid can be pre-calculated in the camera calibration stage or calculated in real time by CPU. Since there are not many values in the sparse grid (typical values that are used for Bx and By are 16, so there are only 1/256 values in sparse grid as there are pixels in the image), it would not take long to evaluate every element in it. However for systems which do not have the resources to even do this, the look up table method can be utilized to quickly evaluate the trigonometric functions related to the cylindrical transformation.

The backwards transformation from cylindrical coordinates is given by:

$(x,y)=T^{-1}(\phi,h)=(f\tan(\phi), f \cdot h \cdot \sec(\phi))$

This transformation can be approximated quickly if there is a look up table of the tan(.) and sec(.) functions. For example, a look up table of the tan(.) function is a set of values Ti, i=0, . . . , N−1 such that:

$$T_i = \tan\left(\varphi_{min} + i \cdot \frac{\varphi_{max} - \varphi_{min}}{N}\right)$$

The table covers value through [(φ$_{min}$, φ$_{max}$). To calculate an approximation of tan(.) value within the range, the lookup table can be used by interpolating between its values. Bilinear interpolation is used:

tan(φ) for φ in [φ$_{min}$,φ$_{max}$) using the LUT $i$=floor((φ−φ$_{min}$)/N)

$fi$=(φ−φ$_{min}$)/N−i tan(φ)≈(1−fi)*T$_i$+fi*T$_{i+1}$

By using look up tables of 128 values each in the range of [0, π/4], the image warping results are visually undistinguishable from the transformation which uses the precise functions.

The final stage in generating the panoramic image is finding the optimal seam between each pair of consecutive adjacent images to determine where to locate pixels of each image. After this stage is completed by Stitching engine 360, panoramic image 399 is generated as a result. The panoramic image 399 may be provided on a screen of digital camera 300 in real time.

Typically, in the background art, when capturing a sequence of images to generate a panoramic image, the exposure settings are preset according to the first image and kept constant, in order to avoid unpleasant lighting changes in the stitched panorama result. However, since capturing the sequence usually requires the photographer to rotate around an imaginary axis, it is not uncommon to encounter variations between backlighting and direct-lighting throughout the capturing sequence. This illumination variation may result in some parts of the panorama being over-exposed or under-exposed. As a result, the overall quality of the panorama may deteriorate and not take into consideration the actual illumination range of the scene. This comes as an additional deterioration to the already limited dynamic range of the camera sensor that may not contain the entire illumination range of a scene (regardless of whether it is the field of view). However, by employing an embodiment of digital camera 300, the over/under exposure phenomenon in regular panoramic results may be eliminated. Digital camera 300 enables the generation of an on-camera, real-time panoramic image having a high dynamic range.

The above specification, examples and data provide a description of the manufacture and use of the composition of the invention. Since many embodiments of the invention can be made without departing from the spirit and scope of the invention, the invention also resides in the claims hereinafter appended.

What is claimed is:

1. A method, comprising:
    employing a digital camera to capture a sequence of frames such that captured frames of the sequence of frames alternate between a plurality of sets of frames in which each set includes at least two frames and each frame in each set has a different exposure than each other frame in the set, wherein each set of frames of the plurality of sets of frames includes a nominal exposure frame;
    saving an initial set of frames of the plurality of sets of frames;
    for each set of frames of the sequence of frames that is captured after the initial set of frames has been captured, making a determination as to whether or not the captured set of frames should be saved, wherein the determination is made based, at least in part, on overlap between the nominal exposure frame of the captured set of frames and a reference frame, wherein the reference frame is a previously saved nominal exposure frame;
    based on the determination, saving the sets of frames for which it is determined that the set of frames should be saved;
    for each of the saved set of frames:
        aligning the frames of the set of frames with each other; and
        performing image mixing of the frames in the set of frames to generate a high dynamic range image; and
    after generating at least two high dynamic range images from the saved sets of frames, employing the digital camera to generate a panoramic, high dynamic range image from each of the high dynamic range images.

2. The method of claim 1, further comprising, for each of the saved set of frames of the sequence of frames, after performing image mixing of the frames in the set of frames to generate a high dynamic range image, performing tone mapping on the high dynamic range image.

3. The method of claim 1, wherein making the determination as to whether or not the captured set of frames should be saved is accomplished based on both of: overlap between the nominal exposure frame of the captured set of frames and a previously saved nominal exposure frame, and by a determination as to the amount of local motion between the nominal exposure frame of the captured set of frames and a previously saved nominal exposure frame.

4. The method of claim 1, further comprising:
    displaying the panoramic, high dynamic range image on a screen of the digital camera.

5. The method of claim 1, wherein the sequence of frames is a live video stream, and wherein capturing the live video stream is accomplished at a constant frame rate of at least ten frames per second.

6. The method of claim 1, wherein the captured sequence of frames is saved in a buffer such that only one set of frames is saved at a time by the buffer, and wherein, apart from the frames saved by the buffer, the only frames of the captured sequence of frames that are saved are the predetermined number of sets of frames saved based on the determinations.

7. The method of claim 1, wherein employing the digital camera to generate the panoramic, high dynamic range image from each of the high dynamic range images includes employing an algorithm to determine an optimal seam between each pair of adjacent high dynamic range images to determine where to locate pixels of each image in the panoramic, high dynamic range image.

8. The method of claim 1, wherein capturing the sequence of frames is accomplished such that each of the sets of frames includes at least three frames, and wherein capturing the sequence of frames is accomplished such that the each of the sets of frames includes the nominal exposure frame, an under-exposed frame, and an over-exposed frame.

9. The method of claim 1, wherein the nominal frame of the initial set of frames is initially employed as the reference frame.

10. The method of claim 9, further comprising:
    each time a new set of frames is saved based on the determination, replacing the current reference frame with the nominal frame of the most recently saved set of frames.

11. An apparatus, comprising:
    a digital camera, including:
        a processor that is configured to control the performance of actions, including:
            enabling capture of a sequence of frames such that captured frames of the sequence of frames alternate between a plurality of sets of frames in which each set includes at least two frames and each frame in each set has a different exposure than each other frame in the set, wherein each set of frames of the plurality of sets of frames includes a nominal exposure frame;
            saving an initial set of frames of the plurality of sets of frames;
            for each set of frames of the sequence of frames that is captured after the initial set of frames has been captured, making a determination as to whether or not the captured set of frames should be saved, wherein the determination is made based, at least in part, on overlap between the nominal exposure frame of the captured set of frames and a reference frame, wherein the reference frame is a previously saved nominal exposure frame;
            based on the determination, saving the sets of frames for which it is determined that the set of frames should be saved;
            for each of the saved set of frames:
                aligning the frames of the set of frames with each other; and
                performing image mixing of the frames in the set of frames to generate a high dynamic range image; and
            after generating at least two high dynamic range images from the saved sets of frames, enabling generation of a panoramic, high dynamic range image from each of the high dynamic range images.

12. The apparatus of claim 11, wherein the processor is configured to further enable, for each of the saved set of frames of the sequence of frames, after performing image mixing of the frames in the set of frames to generate a high dynamic range image, performing tone mapping on the high dynamic range image.

13. The apparatus of claim 11, wherein the processor is further configured such that making the determination as to whether or not the captured set of frames should be saved is accomplished based on both of: overlap between the nominal exposure frame of the captured set of frames and a previously saved nominal exposure frame, and by a determination as to the amount of local motion between the nominal exposure frame of the captured set of frames and a previously saved nominal exposure frame.

14. The apparatus of claim 11, wherein the sequence of frames is a live video stream, and wherein the processor is further configured such that capturing the live video stream is accomplished at a constant frame rate of at least ten frames per second.

15. The apparatus of claim 11, wherein the processor is further configured such that the captured sequence of frames is saved in a buffer such that only one set of frames is saved at a time by the buffer, and wherein, apart from the frames saved by the buffer, the only frames of the captured sequence of frames that are saved are the predetermined number of sets of frames saved based on the determinations.

16. The apparatus of claim 11, wherein the processor is further configured such that generating the panoramic, high dynamic range image from each of the high dynamic range images includes employing an algorithm to determine an optimal seam between each pair of adjacent high dynamic range images to determine where to locate pixels of each image in the panoramic, high dynamic range image.

17. The apparatus of claim 11, wherein the processor is further configured such that capturing the sequence of frames is accomplished such that each of the sets of frames includes at least three frames, and wherein the processor is further configured such that capturing the sequence of frames is accomplished such that each of the sets of frames includes the nominal exposure frame, an under-exposed frame, and an over-exposed frame.

18. The apparatus of claim 11, wherein the processor is further configured such that the nominal frame of the initial set of frames is initially employed as the reference frame.

19. The apparatus of claim 18, wherein the processor is configured to further enable:
each time a new set of frames is saved based on the determination, replacing the current reference frame with the nominal frame of the most recently saved set of frames.

20. A tangible, processor-readable storage medium arranged to encode processor-readable code, which, when executed by one or more processors, enables actions, comprising:

enabling a digital camera to capture of a sequence of frames such that captured frames of the sequence of frames alternate between a plurality of sets of frames in which each set includes at least two frames and each frame in each set has a different exposure than each other frame in the set, wherein each set of frames of the plurality of sets of frames includes a nominal exposure frame;

saving an initial set of frames of the plurality of sets of frames;

for each set of frames of the sequence of frames that is captured after the initial set of frames has been captured, making a determination as to whether or not the captured set of frames should be saved, wherein the determination is made based, at least in part, on overlap between the nominal exposure frame of the captured set of frames and a reference frame, wherein the reference frame is a previously saved nominal exposure frame;

based on the determination, saving the sets of frames for which it is determined that the set of frames should be saved;

for each of the saved set of frames:
aligning the frames of the set of frames with each other; and
performing image mixing of the frames in the set of frames to generate a high dynamic range image; and after generating at least two high dynamic range images from the saved sets of frames, enabling the digital camera to generate a panoramic, high dynamic range image from each of the high dynamic range images.

\* \* \* \* \*